US009241299B2

(12) United States Patent
Zhao et al.

(10) Patent No.: US 9,241,299 B2
(45) Date of Patent: Jan. 19, 2016

(54) METHOD AND DEVICE FOR DISCOVERING UE, FIRST UE AND BASE STATION

(71) Applicant: NTT DoCoMo, Inc., Tokyo (JP)

(72) Inventors: Qun Zhao, Beijing (CN); Yongsheng Zhang, Beijing (CN); Hirohito Suda, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 259 days.

(21) Appl. No.: 13/942,863

(22) Filed: Jul. 16, 2013

(65) Prior Publication Data

US 2014/0024369 A1  Jan. 23, 2014

(30) Foreign Application Priority Data

Jul. 18, 2012  (CN) .......................... 2012 1 0249992

(51) Int. Cl.
*H04W 48/14*  (2009.01)
*H04W 48/16*  (2009.01)
*H04W 8/00*  (2009.01)
H04W 8/18  (2009.01)
H04W 76/02  (2009.01)

(52) U.S. Cl.
CPC .............. *H04W 48/16* (2013.01); *H04W 8/005* (2013.01); *H04W 8/186* (2013.01); *H04W 76/023* (2013.01)

(58) Field of Classification Search
CPC ...... H04W 48/08; H04W 48/14; H04W 48/16
USPC ................................................ 455/41.2, 434
See application file for complete search history.

(56) References Cited

U.S. PATENT DOCUMENTS

2010/0165882 A1* 7/2010 Palanki et al. ................ 370/254
2011/0258313 A1 10/2011 Mallik et al.

FOREIGN PATENT DOCUMENTS

WO  2011/130630 A1  10/2011
WO  2012/015698 A1  2/2012

OTHER PUBLICATIONS

Extended European Search Report, Application No. 13176917.6, Oct. 30, 2013.

* cited by examiner

*Primary Examiner* — Christopher M Brandt
(74) *Attorney, Agent, or Firm* — Harness, Dickey & Pierce, PLC (57) ABSTRACT

The present invention discloses a method and a device for discovering a UE, a first UE and a base station. The method for discovering a UE comprises the steps of: monitoring, by a first UE, an uplink signal in a mobile communication system; extracting, by the first UE, first information for identifying a UE that is to be discovered and that transmits the uplink signal from the monitored uplink signal; transmitting, by the first UE, a monitoring report message carrying the first information to a base station, acquiring, by the first UE, the device ID of the UE to be discovered in accordance with the monitoring report response message and completing the discovery process of the UE. According to the present invention, it is able to discover the UE without changing a channel system of an existing system and occupying time-frequency resources of the system.

17 Claims, 4 Drawing Sheets

METHOD AND DEVICE FOR DISCOVERING UE, FIRST UE AND BASE STATION

TECHNICAL FIELD

The present invention relates to the field of mobile communication technology, in particular to a method and a device for discovering a User Equipment (UE), a first UE, and a base station.

BACKGROUND

The rise of mobile Internet applications has brought about new challenges and requirements, e.g., higher user rate and more flexible communication mode, for the existing mobile communication technology.

New radio technologies, such as Device to Device (D2D) communication technology or enhanced Local Access (eLA) technology, have been developed to meet these requirements.

Different from any previous mode where the communication is merely performed in a mobile communication network via a link between a user and a base station, the D2D communication technology tries to perform the communication via a direct radio link between the users, while the eLA technology tries to set a local access node with a low power and then performs the communication via a radio link between the user and the local access node. Generally, the link between the users or between the user and the local access node has a short transmission distance and a high link quality, and can provide a high frequency reuse gain. As a result, it can help to ease the problems of constrained spectrum resources of a macro cell as well as low user rate.

In order to realize the communication between the users or between the user and the local access node, at least one of the users or the local access node must at first discover the other neighboring users, and then establish a connection with the discovered user for communication. Different from the base station in the existing mobile communication, the user or the local access node will not transmit a sync signal or a reference signal periodically to help the user to identify a cell ID. Thus, it is necessary to design a scheme so as to discover the neighboring users by the user or the local access node.

An existing method for discovering a UE is realized by setting a specific physical layer channel, which occupies certain time-frequency resources and is dedicated to identify a neighboring UE. For example, a UE will use the specific physical layer channel to broadcast a signal including its ID information, while the other neighboring UE will monitor the specific physical layer channel, receive a discovering signal and recover a UE ID included therein. In other words, the UE that transmits the broadcast signal will be discovered.

However, such a method needs to occupy certain time-frequency resources for discovering the UE, and these resources cannot be used for data transmission, so a fixed overhead of a system will be increased. In addition, a new physical layer channel introduced into the existing system will certainly have a significantly impact thereon.

SUMMARY

An object of the present invention is to provide a method and a device for discovering a UE, a first UE, and a base station, so as to discover the UE without changing a channel system of an existing system and occupying time-frequency resources of the system.

In order to achieve the above-mentioned object, the present invention provides a method for discovering a UE, comprising:

monitoring, by a first UE, an uplink signal in a mobile communication system;

extracting, by the first UE, first information for identifying a UE that is to be discovered and that transmits the uplink signal from the monitored uplink signal;

transmitting, by the first UE, a monitoring report message carrying the first information to a base station so that the base station can determine the UE to be discovered in accordance with the first information carried in the monitoring report message upon receiving the monitoring report message, and return a monitoring report response message carrying a device ID of the UE to be discovered to the first UE; and upon receiving the monitoring report response message, acquiring, by the first UE, the device ID of the UE to be discovered in accordance with the monitoring report response message and completing the discovery process of the UE.

The first UE is a user terminal device or an enhanced local access (eLA) device.

The uplink signal is a Sounding Reference Signal (SRS), and the first information is information of the SRS.

The uplink signal is a signal on a resource block (RB) of an uplink subframe on a Physical Uplink Shared Channel (PUSCH), and the first information is signal intensity of the signal on the RB of the uplink subframe on the PUSCH.

The step of monitoring, by the first UE, the uplink signal in the mobile communication system comprises:

determining, by the first UE, time-frequency resources of a signal to be monitored; and sampling, by the first UE, the signals on the time-frequency resources by using an uplink signal reception technique, to obtain a baseband sampled signal.

The method for discovering a UE further comprises:

receiving, by the first UE, a user update message carrying a device ID of a second UE transmitted from the base station, and after the second UE transmits the first information extracted from the monitored uplink signal to the base station, identifying, by the base station, the first UE in accordance with the first information carried in the monitoring report message; and acquiring, by the first UE, the device ID of the second UE in accordance with the user update message, and completing the discovery process of the second UE.

The monitoring report response message specifically includes an message that is returned to the first UE and carries the device ID of the UE to be discovered when the base station, after identifying the UE to be discovered, judges that the UE to be discovered is allowed to be discovered in accordance with a strategy corresponding to the UE to be discovered.

The method for discovering a UE further comprises:

upon receiving a control message transmitted from the base station after the base station cannot identify the UE to be discovered, performing, by the first UE, an uplink signal transmission process in accordance with transmission parameters carried in the control message, so that the uplink signal transmitted by the first UE in accordance with the carried transmission parameters can be monitored more easily.

In order to achieve the above object, the present invention further provides a device for discovering a UE, comprising:

a monitoring module, configured to monitor an uplink signal in a mobile communication system;

a parsing module, configured to extract first information for identifying a UE that is to be discovered and that transmits the uplink signal from the monitored uplink signal;

a first transmitting module, configured to transmit a monitoring report message carrying the first information to a base station so that the base station can identify the UE to be discovered in accordance with the first information carried in the monitoring report message upon receiving the monitoring report message, and return a monitoring report response message carrying a device ID of the UE to be discovered to the first UE; and a first discovering module, configured to, upon receiving the monitoring report response message transmitted after the base station identifies the UE to be discovered, acquire the device ID of the UE to be discovered in accordance with the monitoring report response message and complete the discovery process of the UE.

The monitoring module specifically comprises:

a determining unit, configured to determine time-frequency resources of a signal to be monitored; and a sampling unit configured to sample the signal on the time-frequency resources by using an uplink signal reception technique, to obtain a baseband sampled signal.

The device for discovering a UE, further comprises:

a first receiving module, configured to receive a user update message carrying a device ID of a second UE transmitted from the base station, wherein after the second UE transmits the first information extracted from the monitored uplink signal to the base station, the base station identifies the first UE in accordance with the first information carried in the monitoring report message; and a second discovering module, configured to acquire the device ID of the second UE in accordance with the user update message, and complete the discovery process of the second UE.

The device for discovering a UE, further comprises:

a transmission controlling module, configured to, upon receiving a control message transmitted from the base station after the base station cannot identify the UE to be discovered, control a transmitter to perform an uplink signal transmission process in accordance with transmission parameters carried in the control message, so that the uplink signal transmitted by the first UE in accordance with the carried transmission parameters can be monitored more easily.

The monitoring report response message specifically includes an message that is returned to the first UE and carries the device ID of the UE to be discovered when the base station, after identifying the UE to be discovered, judges that the UE to be discovered is allowed to be discovered in accordance with a strategy corresponding to the UE to be discovered.

In order to achieve the above object, the present invention further provides a first UE, comprising:

a transmitter;

a receiver;

a decision making module, configured to determine time-frequency resources of a signal to be monitored in accordance with a cell broadcast message, and control the receiver to sample the signal on the time-frequency resources by using an uplink signal reception technique, to obtain a baseband sampled signal;

a parsing module, configured to extract first information for identifying a UE that is to be discovered and that transmits the uplink signal from the monitored uplink signal;

a first transmitting module, configured to transmit a monitoring report message carrying the first information to a base station so that the base station can identify the UE to be discovered in accordance with the first information carried in the monitoring report message upon receiving the monitoring report message, and return a monitoring report response message carrying a device ID of the UE to be discovered to the first UE; and a first discovering module, configured to, upon receiving the monitoring report response message transmitted after the base station identifies the UE to be discovered, acquire the device ID of the UE to be discovered in accordance with the monitoring report response message and complete the discovery process of the UE.

The first UE further comprises:

a first receiving module, configured to receive a user update message carrying a device ID of a second UE transmitted from the base station, wherein after the second UE transmits the first information extracted from the monitored uplink signal to the base station, the base station identifies the first UE in accordance with the first information carried in the monitoring report message; and a second discovering module, configured to acquire the device ID of the second UE in accordance with the user update message, and complete the discovery process of the second UE.

The first UE further comprises:

a transmission controlling module, configured to, upon receiving a control message transmitted from the base station after the base station cannot identify the UE to be discovered, control a transmitter to perform an uplink signal transmission process in accordance with transmission parameters carried in the control message, so that the uplink signal transmitted by the transmitter can be monitored more easily.

The monitoring report response message specifically includes an message that is returned to the first UE and carries the device ID of the UE to be discovered when the base station, after identifying the UE to be discovered, judges that the UE to be discovered is allowed to be discovered in accordance with a strategy corresponding to the UE to be discovered.

In order to achieve the above object, the present invention further provides a base station, comprising:

a second receiving module, configured to receive a monitoring report message carrying first information, which is the information extracted from an uplink signal monitored by the first UE in a mobile communication system for identifying the UE that is to be discovered and that transmits the uplink signal;

a determining module, configured to determine the UE to be discovered in accordance with the first information; and a first transmitting module, configured to return a monitoring report response message carrying a device ID of the UE to be discovered to the first UE, so that the first UE can complete the discovery process of the UE in accordance with the device ID of the UE to be discovered.

The first UE is a user terminal device or an enhanced local access (eLA) device.

The base station further comprises:

a second transmitting module, configured to, upon identifying the first UE in accordance with the first information carried in the monitoring report message transmitted from the second UE, transmit a user update message carrying the device ID of the second UE to the first UE, so that the first UE completes the discovery process of the second UE in accordance with the device ID of the second UE.

The base station further comprises;

a second transmitting module, configured to transmit a control message carrying transmission parameters after the UE to be discovered cannot be identified, so that the first UE performs an uplink signal transmission process in accordance with the transmission parameters and can be monitored more easily.

The present invention at least has the following beneficial effects.

According to the method for discovering a UE, the first UE needs only to monitor the uplink signal transmitted from the other surrounding UEs to the base station, selectively extracts information enabling the base station to identify the first UE that transmits the uplink signal, and then transmits the information to the base station. The base station identifies the first UE in accordance with the information, and returns an identification result to the first UE, so that the first UE completes the final discovery process of the first UE. It may be apparent that, the method according to the present invention does not need to occupy specific time-frequency resources, so the utilization of the system spectrum resources will be improved. In addition, the method according to the present invention does not need to set a separate channel to complete the discovery of the UE, so there are very few influences on the existing mobile communication system.

DETAILED DESCRIPTION

According to a method and a device for discovering a UE, and a first UE of the present invention, the discovery of the UE is realized by monitoring an uplink signal between the UE and a base station, acquiring information from the uplink signal, transmitting the information to the base station, identifying the UE by the base station in accordance with the information, and finally receiving an ID of the identified UE from the base station.

Figure 1:
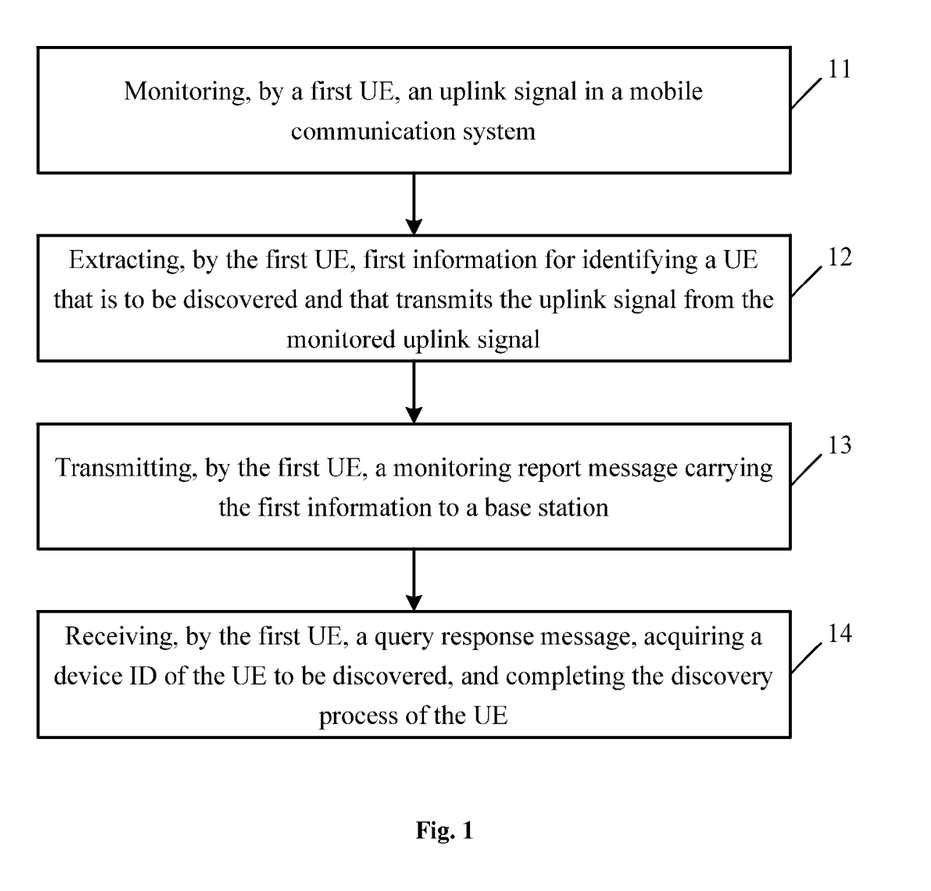
FIG. 1 is a flow chart of a method for discovering a UE according to embodiments of the present invention.

As shown in FIG. 1, a method for discovering a UE according to embodiments of the present invention comprises the following steps:

Step 11: monitoring, by a first UE, an uplink signal in a mobile communication system;

Step 12: extracting, by the first UE, first information for identifying a UE that is to be discovered and that transmits the uplink signal from the monitored uplink signal;

Step 13: transmitting, by the first UE, a monitoring report message carrying the first information to a base station so that the base station can determine the UE to be discovered in accordance with the first information carried in the monitoring report message upon receiving the monitoring report message, and return a monitoring report response message carrying a device ID of the UE to be discovered to the first UE; and Step 14: upon receiving the monitoring report response message transmitted by the base station after the base station identifies the UE to be discovered, acquiring, by the first UE, the device ID of the UE to be discovered in accordance with the monitoring report response message and completing the discovery process of the UE.

According to the method for discovering a UE, the first UE needs only to monitor the uplink signal transmitted from the other surrounding first UEs to the base station, selectively extracts information enabling the base station to identify the first UE that transmits the uplink signal, and then transmits the information to the base station. The base station identifies the first UE in accordance with the information, and returns an identification result to the first UE, so as to complete the final discovery process of the first UE. It may be apparent that, the method according to the present invention does not need to occupy specific time-frequency resources, so the utilization of the system spectrum resources will be improved. In addition, the method according to the present invention does not need to set a separate channel to complete the discovery of the UE, so there are very few influences on the existing mobile communication system.

It should be appreciated that, the first UE according to the embodiment of the present invention may be a user terminal device, an enhanced local access (eLA) device, or a user terminal of any other type, and there is no difference between the implementations thereof. The information interaction between the first UE and the base station may be performed via a radio link of a mobile communication network, or via a possible wired connection (e.g., an optical fiber connection between the eLA device and the base station), and there is no difference between the implementations thereof either.

Figure 2:
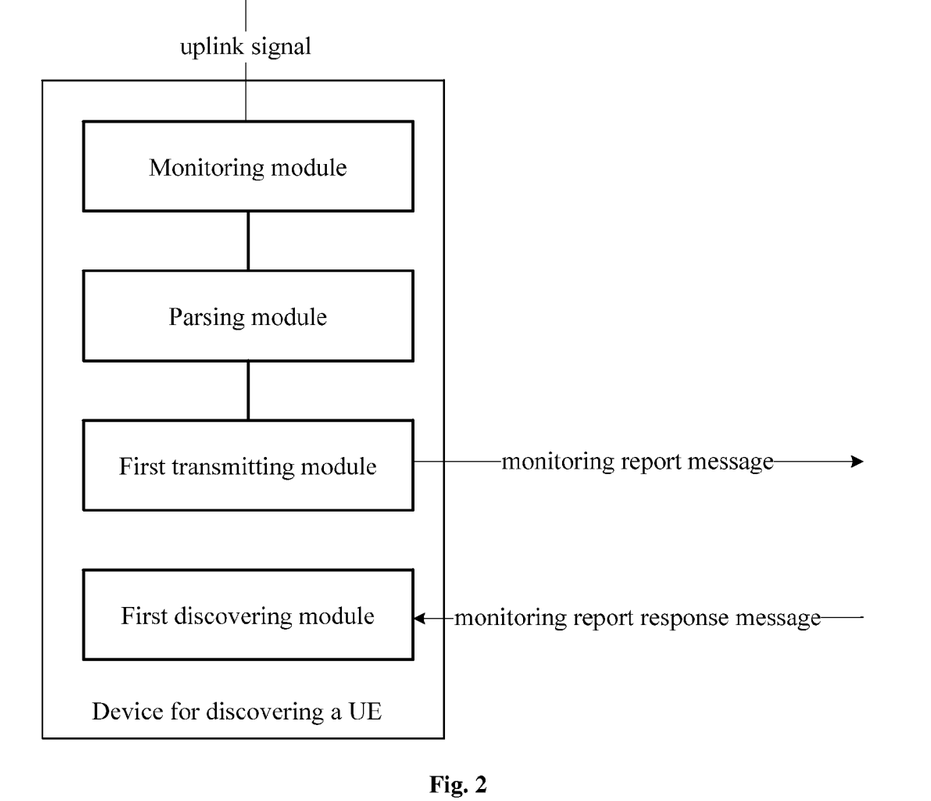
FIG. 2 is a structural schematic view showing a device for discovering a UE according to embodiments of the present invention.

As shown in FIG. 2, a device for discovering a UE according to embodiments of the present invention comprises:

a monitoring module, configured to monitor an uplink signal in a mobile communication system;

a parsing module, configured to extract first information for identifying a UE that is to be discovered and that transmits the uplink signal from the monitored uplink signal;

a first transmitting module, configured to transmit a monitoring report message carrying the first information to a base station so that the base station can identify the UE to be discovered in accordance with the first information carried in the monitoring report message upon receiving the monitoring report message, and return a monitoring report response message carrying a device ID of the UE to be discovered to the first UE; and a first discovering module, configured to, upon receiving the monitoring report response message transmitted after the base station identifies the UE to be discovered, acquire the device ID of the UE to be discovered in accordance with the monitoring report response message and complete the discovery process of the UE.

In a preferred embodiment, the base station can determine which UE transmits the uplink signal based on the signal from the UE, so if the UE directly transmits the monitored uplink signal to the base station, the base station can certainly determine a corresponding UE in accordance with the uplink signal.

However, the uplink signal transmitted by the UE may include a lot of information, some of which can be used for identifying the UE and some of which cannot. If the monitored uplink signal is completely transmitted to the base station, the data transmission volume will be too large. As a result, in a preferred embodiment, the information for identifying the UE that transmits the uplink signal will be extracted from the monitored uplink signal, and the information irrelevant for identifying the UE will be removed, so as to enable the base station to identify the UE and meanwhile to reduce the data transmission volume.

In a preferred embodiment, the first UE needs to monitor the uplink signal in the mobile communication system. Of course, it can monitor the uplink signal in real time, but such a manner will cause remarkably power consumption and large processing resource consumption. In order to reduce the power consumption and improve the utilization of the processing resources, the step of monitoring, by the first UE, the uplink signal in the mobile communication system comprises:

determining, by the first UE, time-frequency resources of a signal to be monitored; and sampling, by the first UE, the signal on the time-frequency resources by using an uplink signal reception technique, to obtain a baseband sampled signal.

The monitoring module specifically comprises:

a determining unit, configured to determine time-frequency resources of a signal to be monitored; and a sampling unit, configured to sample the signal on the time-frequency resource by using an uplink signal reception technique, to obtain a baseband sampled signal.

Through the above process, the method and device according to the present invention may monitor the uplink signal on the determined time-frequency resources, rather than on all the time-frequency resources. As a result, the efficiency of monitoring is improved in terms of the power consumption and the processing resource consumption.

As an example, UE A may receive a cell message broadcast by the base station, judge the positions of uplink physical layer channels according to the cell message, select a suitable physical layer channel for monitoring, and then monitor at the selected time-frequency resources, e.g., obtain the baseband sampled signal of the signal at the time-frequency resources by using the uplink signal reception technique. UE B may transmit a specific uplink signal on the time-frequency resources in accordance with the system configuration, e.g., the first UE may merely transmit an SRS on a specific symbol of a specific frame. As a result, if UE B is adjacent to UE A, UE A can monitor the uplink signal transmitted by UE B.

The formats and types of the uplink signals are not limited in the above descriptions. The uplink signal of a user may be user data, or an uplink control signal, as long as the information sufficient to enable the base station to identify the UE transmitting the uplink signal can be recovered from the uplink signal. Different detection algorithms may be used to recover information from different uplink signals. The first information extracted from the monitored uplink signal may be information of various types, as long as it can be extracted from the uplink signal and can be used to identify the UE. Following are several possible implementation modes for the first information.

Implementation Mode 1

In this mode, the uplink signal is an SRS, and the first information is information of the SRS.

In order to support frequency-selective scheduling, the UE needs to detect a large bandwidth. Usually, this bandwidth is far larger than a current bandwidth for data transmission, so the SRS needs to be used.

In a LTE system, eNodeB may schedule each UE to transmit the SRS once or periodically. The period for transmitting the SRS may be 2/5/10/20/40/80/160/320 ms.

Since the UE needs to transmit the SRS on specific time-frequency resources, it can acquire the SRS transmitted by the other UE by monitoring the specific time-frequency resources, and then determine various parameters such as a bandwidth, a position, an option "comb", and a cyclic shift value of the acquired SRS.

At this time, if the base station stores the parameters of each received SRS and a device ID transmitting the SRS correspondingly, it can find the UE transmitting the SRS from a correspondence table upon receiving the parameters such as the bandwidth, the position, the option "comb" and the cyclic shift value of the SRS reported by the UE, and return the determined device ID to the UE transmitting the parameters.

Figure 3:
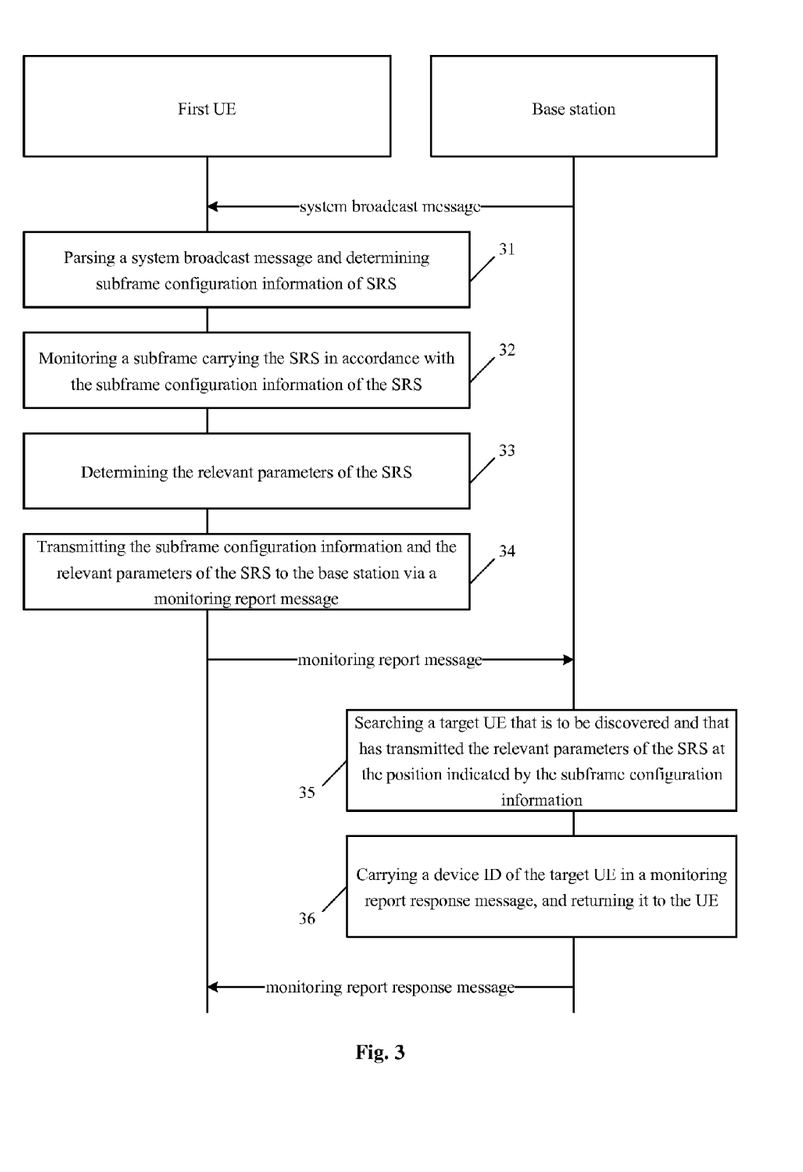
FIG. 3 is a flow chart of a method for discovering a UE when an SRS is used according to embodiments of the present invention.

For example, as shown in FIG. 3, the method comprises the following steps.

Step 31: receiving and parsing, by the first UE, a system broadcast message, and determining subframe configuration information of the SRS.

Here, the subframe configuration information is position information of the SRS. For example, the first UE may, by parsing the system broadcast message, know that the last symbol of a subframe 3 of a frame 11 is used for transmitting the SRS, then the first UE can monitor this symbol and perform the detection.

Step 32: monitoring, by the first UE, a subframe carrying the SRS in accordance with the subframe configuration information of the SRS.

Step 33: determining, by the first UE, the relevant parameters of the SRS carried in the monitored subframe, such as the bandwidth, the position of the SRS in the subframe and the cyclic shift value, in accordance with a monitoring result. For example, the bandwidth is 12 Resource Blocks (RB), the position is from the $37^{th}$ RB to the $48^{th}$ RB, and the cyclic shift value is 1.

Step 34: transmitting, by the first UE, the subframe configuration information and the relevant parameters of the SRS to the base station via a monitoring report message.

Step 35: upon receiving the monitoring report message, searching, by the base station, a UE that is to be discovered and that has transmitted the relevant parameters of the SRS at the position indicated by the subframe configuration information.

For example, the base station will search in Step 35 the UE that has ever transmitted the SRS having a bandwidth of 12 RBs, a starting position of the $37^{th}$ RB, and a cyclic shift value of 1 on the subframe 3 of the frame 11.

Step 36: carrying, by the base station, a device ID of the UE to be discovered in a monitoring report response message, and returning it to the first UE.

Of course, the above is merely for illustrative purposes, and a person skilled in the art may implement the discovery of the UE based on the SRS through any other processes, and these processes will not be repeated herein.

Implementation Mode 2

In this mode, the uplink signal is a signal on a RB of an uplink subframe in a PUSCH, and the first information is signal intensity of a signal on the RB of the uplink subframe in the PUSCH.

The PUSCH (Physical Uplink Shared Channel) is used to carry the data from a transmission channel, and the word "shared" means that an identical physical channel may be used by a plurality of users in a time-sharing manner.

Hence, the UE can monitor the PUSCH and acquire the signal intensity of the signal on the RB of the uplink subframe in the monitored PUSCH.

The base station owns the user scheduling information of the uplink subframe, i.e., the base station knows which UE has transmitted the signal on each RB of the uplink subframe, so when the base station receives the signal intensity of the signal on the RB of the uplink subframe from the UE, it may determine which UEs are adjacent to the monitored UE in accordance with the signal intensity, and then return the determined UE IDs to the UE that initiates the discovery process.

Figure 4:
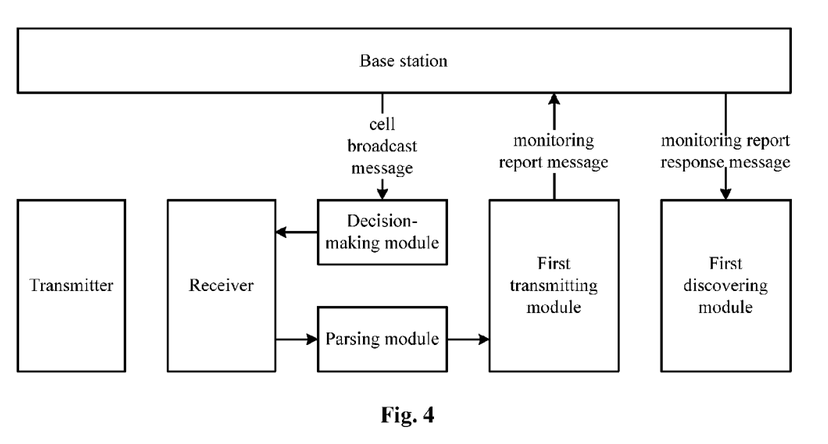
FIG. 4 is a structural schematic view showing a first UE according to embodiments of the present invention.

As shown in FIG. 4, a first UE according to one embodiment of the present invention comprises:

a transmitter;

a receiver;

a decision making module, configured to determine a time-frequency resource of a signal to be monitored in accordance with a cell broadcast message, and control the receiver to sample signals on the time-frequency resource by using an uplink signal reception technique, to obtain a baseband sampled signal;

a parsing module, configured to extract first information for identifying a UE that is to be discovered and that transmits the uplink signal from the monitored uplink signal;

a first transmitting module, configured to transmit a monitoring report message carrying the first information to a base station so that the base station can identify the UE to be discovered in accordance with the first information carried in the monitoring report message upon receiving the monitoring report message, and return a monitoring report response message carrying a device ID of the UE to be discovered to the first UE; and a first discovering module, configured to, upon receiving the monitoring report response message transmitted after the base station identifies the UE to be discovered, acquire the device ID of the UE to be discovered in accordance with the monitoring report response message and complete the discovery process of the UE.

In a preferred embodiment, the UE needs to monitor the uplink signal of the other UE, so it needs to include a receiver that should be implemented at the base station. Any change to the receiving module of the first UE may be identical to or different from that in D2D communication. For example, in a LTE-FDD system, if an uplink frequency of an existing cellular communication system is used for communication, it is required in both the present invention and the D2D communication that the receiving module can receive the uplink signal. However, if a downlink frequency is used for communication, the signal from the other first user can be received in the pure D2D communication without any additional receiver, while the first UE according to the present invention still needs the above receiver to monitor the uplink signal.

In a preferred embodiment, the base station records the correspondence between the UE IDs and the information such as a format of the uplink signal and the position in the time-frequency resource when it normally receives the uplink signal transmitted from the UE. In an actual implementation process, limited uplink signals may be monitored, so the base station needs only to record the correspondence between the format of the selected uplink signals, rather than the correspondence between all the uplink signals and the UE IDs. Of course, the base station may also set a time threshold, and the out-of-date correspondence may be abandoned. The time threshold shall be sufficient long to ensure that the useful correspondence is not abandoned. When the base station receives the monitoring report message from the UE, it will match the information, such as the frame number included in the message and the detection result, with the correspondence stored in the base station, so as to find the corresponding ID of the UE transmitting the uplink signal. After the base station finds the UE ID, the base station will return the ID to the UE that initiates the discovery process via the monitoring report response message.

Through the method of the present invention, it is possible for any UE to initiate the discovery process, and the base station knows the other devices discovered by the first UE. It should be appreciated that, when UE A can discover UE B, UE B should also be able to discover UE A. In order to improve the efficiency of discovery, the method for discovering a UE further comprises:

receiving, by the first UE, a user update message carrying a device ID of a second UE from the base station, and after the second UE sends the first information extracted from the monitored uplink signal to the base station, identifying, by the base station, the first UE in accordance with the first information carried in the monitoring report message; and acquiring, by the first UE, the device ID of the second UE in accordance with the user update message, and completing the discovery process of the second UE.

Through the above way, after the base station determines that UE A has discovered UE B, it directly transmits the device ID of UE A to UE B so that UE B can discover UE A without initiating a new discovery process. As a result, the efficiency of discovering the UE will be improved.

At this time, the device for discovering the UE further comprises:

a first receiving module, configured to receive a user update message carrying a device ID of a second UE from the base station, wherein after the second UE sends the first information extracted from the monitored uplink signal to the base station, the base station identifies the first UE in accordance with the first information carried in the monitoring report message; and a second discovering module, configured to acquire the device ID of the second UE in accordance with the user update message, and complete the discovery process of the second UE.

In a preferred embodiment, the UE may initiate the discovery of a UE on its own initiative, or based on a discovery instruction from the base station. The latter will be described hereinafter.

Under some conditions, the base station may know the approximate positions of the UEs, and at this time, the UEs may discover each other. However, the base station cannot determine the accurate positions of the UEs, so it may notify one of the UEs of the specified time-frequency resources and the signal format, so that the notified UE can monitor the signal on the specified time-frequency resources and parse it in accordance with the signal format.

As compared with the mode where the UE calculates the time-frequency resources and determine the signal format itself, the mode of notifying, by the base station as a scheduler, the UE of the time-frequency resources and the signal format will reduce the processing load desired for the UE, perform the monitoring in a more accurate manner and improve the efficiency of discovering the UE.

In a preferred embodiment, the discovery of a UE shall meet a privacy policy of another UE. Thus, after the base station identifies the UE to be discovered, it will judge whether or not the discovery of the UE to be discovered is allowed in accordance with the policy of the UE to be discovered. The base station will return the monitoring report response message carrying the device ID of the UE to be discovered to the first UE only when the discovery of the UE to be discovered is allowed.

In a preferred embodiment, when the UE is located at different positions, the effects of discovering the surrounding UE may be different. For example, different UEs will adjust their own uplink timing so as to ensure as possible that the uplink signals of all the UEs can reach the base station simultaneously. If the monitored UE is far away from the base station, there is a big timing error caused when the uplink signal of the other UE reaches the monitored UE, so the monitoring effect will decrease. At this time, when the UE judges that its distance from the base station is greater than a threshold value, the monitoring report message may further carry a discovery auxiliary parameter, so that the base station can, upon receiving the monitoring report message, identify the UE to be discovered in accordance with the first information and the discovery auxiliary parameter, and return the monitoring report response message carrying the device ID of the UE to be discovered to the first UE.

In a preferred embodiment, the auxiliary parameter may be the signal intensity.

For example, when the monitored UE is far away from the base station, merely the detection result of the signal from the UE that is close to the monitored UE is accurate. The base station may approximately judge the accuracy degree of the monitoring report message in accordance with the signal intensity, so as to avoid false detection.

In a preferred embodiment, the base station may identify the UE in accordance with a single monitoring report message transmitted by the UE, or the monitoring report messages received within a certain period of time, or after the reception of a predetermined number of monitoring report messages.

As compared with the mode of identifying the UE by using a single monitoring report message, it will be more accurate to identify the UE by using a plurality of monitoring report messages. In addition, the omissions during the identification will be reduced.

In a preferred embodiment, when the base station cannot identify the UE to be discovered in accordance with the first information carried in the monitoring report message but can determine that there are discoverable UEs around the first UE, it may schedule the uplink signal of the first UE to be transmitted in a manner to be discovered by the other UE more easily, thereby to accelerate the discovery process of the UE.

In this mode, the method for discovering a UE further comprises:

upon receiving a control message transmitted from the base station after the base station cannot identify the UE to be discovered, performing, by the first UE, an uplink signal transmission process in accordance with transmission parameters carried in the control message, so that the uplink signal transmitted by the first UE in accordance with the carried transmission parameters can be monitored more easily.

The device for discovering a UE further comprises:

a transmission controlling module, configured to, upon receiving a control message transmitted from the base station after the base station cannot identify the UE to be discovered, control a transmitter to perform an uplink signal transmission process in accordance with transmission parameters carried in the control message, so that the uplink signal transmitted by the first UE in accordance with the carried transmission parameters can be monitored more easily.

In a preferred embodiment, the transmission parameter may be a transmission power or a signal format. For example, the uplink signal may be transmitted at a higher power or in a format that can be more easily monitored (e.g., changing the sequence length of the SRS).

The base station further comprises:

a second receiving module, configured to receive a monitoring report message carrying first information, which is the information extracted from an uplink signal monitored by the first UE in a mobile communication for identifying the UE that is to be discovered and that transmits the uplink signal;

a determining module, configured to determine the UE to be discovered in accordance with the first information; and a transmitting module, configured to return a monitoring report response message carrying a device ID of the UE to be discovered to the first UE, so that the first UE can complete the discovery process of the UE in accordance with the device ID of the UE to be discovered.

The first UE may be a user terminal device or an enhanced local access (eLA) device.

The base station further comprises:

a second transmitting module, configured to, upon identifying the first UE in accordance with the first information carried in the monitoring report message transmitted from the second UE, transmit a user update message carrying the device ID of the second UE to the first UE, so that the first UE completes the discovery process of the second UE in accordance with the device ID of the second UE.

The base station further comprises:

a second transmitting module, configured to transmit a control message carrying transmission parameters after the UE to be discovered cannot be identified, so that the first UE performs an uplink signal transmission process in accordance with the transmission parameters and can be monitored more easily.

The above are merely the embodiments of the present invention. It should be appreciated that, a person skilled in the art may further make improvements and modifications without departing from the principle of the present invention, and these improvements and modifications shall also be considered as the scope of the present invention.

What is claimed is:

1. A method for discovering a User Equipment (UE), comprising:

monitoring, by a first UE, an uplink signal in a mobile communication system;

extracting, by the first UE, first information for identifying a UE that is to be discovered and that transmits the uplink signal from the monitored uplink signal;

transmitting, by the first UE, a monitoring report message carrying the first information to a base station so that the base station can determine the UE to be discovered in accordance with the first information carried in the monitoring report message upon receiving the monitoring report message, and return a monitoring report response message carrying a device ID of the UE to be discovered to the first UE; and upon receiving the monitoring report response message, acquiring, by the first UE, the device ID of the UE to be discovered in accordance with the monitoring report response message and completing the discovery process of the UE;

the method further comprising:

upon receiving a control message transmitted from the base station after the base station cannot identify the UE to be discovered, performing, by the first UE, an uplink signal transmission process in accordance with transmission parameters carried in the control message, so that the uplink signal transmitted by the first UE in accordance with the carried transmission parameters can be monitored more easily.

2. The method according to claim 1, wherein the first UE is a user terminal device or an enhanced local access (eLA) device.

3. The method according to claim 1, wherein the uplink signal is a Sounding Reference Signal (SRS), and the first information is information of the SRS.

4. The method according to claim 1, wherein the uplink signal is a signal on a resource block (RB) of an uplink subframe on a Physical Uplink Shared Channel (PUSCH), and the first information is signal intensity of the signal on the RB of the uplink subframe on the PUSCH.

5. The method according to claim 1, wherein the step of monitoring, by the first UE, the uplink signal in the mobile communication system comprises:

determining, by the first UE, time-frequency resources of a signal to be monitored; and sampling, by the first UE, the signals on the time-frequency resources by using an uplink signal reception technique, to obtain a baseband sampled signal.

6. The method according to claim 1, further comprising:
receiving, by the first UE, a user update message carrying a device ID of a second UE transmitted from the base station, and after the second UE transmits the first information extracted from the monitored uplink signal to the base station, identifying, by the base station, the first UE in accordance with the first information carried in the monitoring report message; and
acquiring, by the first UE, the device ID of the second UE in accordance with the user update message, and completing the discovery process of the second UE.

7. The method according to claim 1, wherein the monitoring report response message specifically includes an message that is returned to the first UE and carries the device ID of the UE to be discovered when the base station, after identifying the UE to be discovered, judges that the UE to be discovered is allowed to be discovered in accordance with a strategy corresponding to the UE to be discovered.

8. A device for discovering a UE, comprising:
a monitoring circuit, configured to monitor an uplink signal in a mobile communication system;
a parsing circuit, configured to extract first information for identifying a UE that is to be discovered and that transmits the uplink signal from the monitored uplink signal;
a first transmitting circuit, configured to transmit a monitoring report message carrying the first information to a base station so that the base station can identify the UE to be discovered in accordance with the first information carried in the monitoring report message upon receiving the monitoring report message, and return a monitoring report response message carrying a device ID of the UE to be discovered to the first UE; and
a first discovering circuit, configured to, upon receiving the monitoring report response message transmitted after the base station identifies the UE to be discovered, acquire the device ID of the UE to be discovered in accordance with the monitoring report response message and complete the discovery process of the UE;
the device further comprising:
a transmission controlling circuit, configured to, upon receiving a control message transmitted from the base station after the base station cannot identify the UE to be discovered, control a transmitter to perform an uplink signal transmission process in accordance with transmission parameters carried in the control message, so that the uplink signal transmitted by the first UE in accordance with the carried transmission parameters can be monitored more easily.

9. The device according to claim 8, wherein the monitoring circuit specifically comprises:
a determining unit, configured to determine time-frequency resources of a signal to be monitored; and
a sampling unit, configured to sample the signal on the time-frequency resources by using an uplink signal reception technique, to obtain a baseband sampled signal.

10. The device according to claim 8, further comprising:
a first receiving circuit, configured to receive a user update message carrying a device ID of a second UE transmitted from the base station, wherein after the second UE transmits the first information extracted from the monitored uplink signal to the base station, the base station identifies the first UE in accordance with the first information carried in the monitoring report message; and
a second discovering circuit, configured to acquire the device ID of the second UE in accordance with the user update message, and complete the discovery process of the second UE.

11. The device according to claim 8, wherein the monitoring report response message specifically includes an message that is returned to the first UE and carries the device ID of the UE to be discovered when the base station, after identifying the UE to be discovered, judges that the UE to be discovered is allowed to be discovered in accordance with a strategy corresponding to the UE to be discovered.

12. A first UE, comprising:
a transmitter;
a receiver;
a decision making circuit, configured to determine time-frequency resources of a signal to be monitored in accordance with a cell broadcast message, and control the receiver to sample the signal on the time-frequency resources by using an uplink signal reception technique, to obtain a baseband sampled signal;
a parsing circuit, configured to extract first information for identifying a UE that is to be discovered and that transmits the uplink signal from the monitored uplink signal;
a first transmitting circuit, configured to transmit a monitoring report message carrying the first information to a base station so that the base station can identify the UE to be discovered in accordance with the first information carried in the monitoring report message upon receiving the monitoring report message, and return a monitoring report response message carrying a device ID of the UE to be discovered to the first UE; and
a first discovering circuit, configured to, upon receiving the monitoring report response message transmitted after the base station identifies the UE to be discovered, acquire the device ID of the UE to be discovered in accordance with the monitoring report response message and complete the discovery process of the UE;
the first UE further comprising:
a transmission controlling circuit, configured to, upon receiving a control message transmitted from the base station after the base station cannot identify the UE to be discovered, control a transmitter to perform an uplink signal transmission process in accordance with transmission parameters carried in the control message, so that the uplink signal transmitted by the transmitter can be monitored more easily.

13. The first UE according to claim 12, further comprising:
a first receiving circuit, configured to receive a user update message carrying a device ID of a second UE transmitted from the base station, wherein after the second UE transmits the first information extracted from the monitored uplink signal to the base station, the base station identifies the first UE in accordance with the first information carried in the monitoring report message; and
a second discovering circuit, configured to acquire the device ID of the second UE in accordance with the user update message, and complete the discovery process of the second UE.

14. The first UE according to claim 12, wherein the monitoring report response message specifically includes an message that is returned to the first UE and carries the device ID of the UE to be discovered when the base station, after identifying the UE to be discovered, judges that the UE to be discovered is allowed to be discovered in accordance with a strategy corresponding to the UE to be discovered.

15. A base station, comprising:
a second receiving circuit, configured to receive a monitoring report message carrying first information, which is the information extracted from an uplink signal monitored by the first UE in a mobile communication system for identifying the UE that is to be discovered and that transmits the uplink signal;
a determining circuit, configured to determine the UE to be discovered in accordance with the first information; and
a first transmitting circuit, configured to return a monitoring report response message carrying a device ID of the UE to be discovered to the first UE, so that the first UE can complete the discovery process of the UE in accordance with the device ID of the UE to be discovered;
the base station further comprising:
a second transmitting circuit, configured to transmit a control message carrying transmission parameters after the UE to be discovered cannot be identified, so that the first UE performs an uplink signal transmission process in accordance with the transmission parameters and can be monitored more easily.

16. The base station according to claim 15, wherein the first UE is a user terminal device or an enhanced local access (eLA) device.

17. The base station according to claim 15, further comprising:
a second transmitting circuit, configured to, upon identifying the first UE in accordance with the first information carried in the monitoring report message transmitted from the second UE, transmit a user update message carrying the device ID of the second UE to the first UE, so that the first UE completes the discovery process of the second UE in accordance with the device ID of the second UE.

* * * * *